Nov. 24, 1925.

A. F. MONEUSE

AUTOMOBILE TIRE

Filed Oct. 27, 1921

1,562,577

Inventor
Alphonse F. Moneuse
By Ithau W. Johnson
Attorney

Patented Nov. 24, 1925.

1,562,577

UNITED STATES PATENT OFFICE.

ALPHONSE F. MONEUSE, OF NEW ROCHELLE, NEW YORK.

AUTOMOBILE TIRE.

Application filed October 27, 1921. Serial No. 510,855.

*To all whom it may concern:*

Be it known that I, ALPHONSE F. MONEUSE, citizen of the United States, residing at New Rochelle, in the county of Westchester and State of New York, have invented certain new and useful Improvements in Automobile Tires, of which the following is a specification.

This invention relates to improvements in automobile tires, and more particularly to a device for preventing injury to the tire resulting from blow-outs.

It is well understood that a blow-out, as the result of a shock, or other causes, occurs in the weakest part of the shoe or tire, and that when such blow-out occurs, the tire is in many instances completely ruined by reason of the extent and location of the rupture of the shoe resulting from the blow-out, and also due to the character of the rupture.

I propose to provide a shoe with a plurality of normally weakened places or points, which points, while weakened sufficiently to cause the blow-out to occur at the normally weakened points, will nevertheless be strong enough and substantial enough to stand all ordinary pressures and shocks in ordinary running or use in the service for which the tire is intended.

The invention contemplates in its broadest sense, the provision of a plurality of weakened places or points in the shoe, which are preferably covered by patches of desired strength and size, cemented, vulcanized or otherwise attached, and in a more restricted sense, the provision of plugs which are seated or embedded in the wall of the tire at intervals, and held therein by suitable means, the plugs, patches or other device covering the holes or openings being adapted to localize the blow-out, or in other words, to cause the blow-out to take place at one or the other of the openings, or at one or the other of the weakened spots or points, whereby solely the predetermined points or places will be blown out, without other injury to the shoe, the idea being that the patches or plugs, or weakened places or points, may be repaired at small expense.

In the preferred form of my invention I provide the tire or shoe with a plurality of small holes in its side wall, the holes being on opposite sides of the shoe and having alternate or staggered arrangement, which holes or openings are normally covered by patches secured to the inside of the wall.

In the drawings illustrating the invention:

Figure 3:
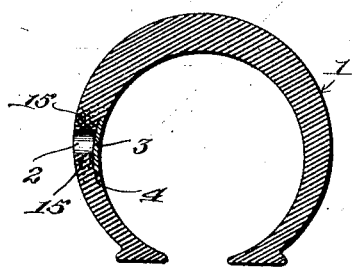
Fig. 3 is a vertical cross section showing the manner of applying the patch.

Referring to the drawings, the numeral 1 designates the shoe or tire, which in carrying out my invention, I provide at intervals a series of holes 2 on opposite sides, the holes having alternate or staggered arrangement. These holes are covered by a series of suitable patches 3 of any suitable material, and secured to the tire in any suitable manner, preferably by some vulcanizing process, and it is understood that the patches are so applied as to present a comparatively smooth and continuous surface for the inside of the tire to prevent chafing of the inner tube, and for this purpose, the wall of the shoe, as shown in Figure 3, may at the point of application of the patches be slightly countersunk, as indicated at 4, so that the inner faces of the patches will lie flush with the inner wall of the tire or shoe.

Figure 1:
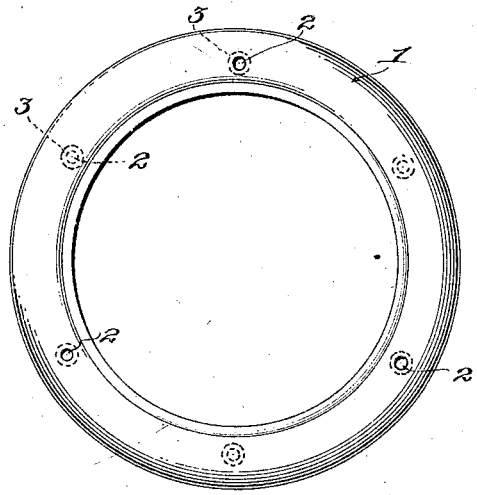
Fig. 1 is a side view of a tire constructed in accordance with this invention.
Figure 2:
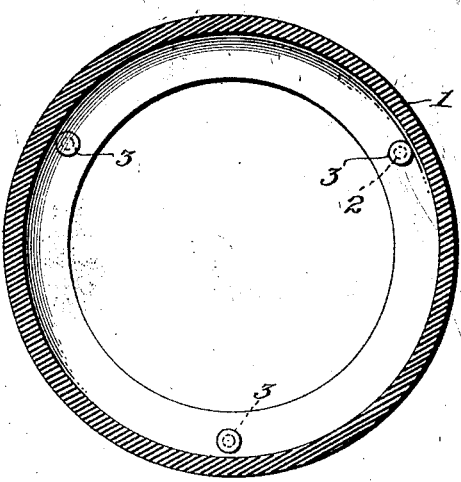
Fig. 2 is a central vertical section of the tire showing the patches as they would appear from the inside of the tire.
Figure 4:
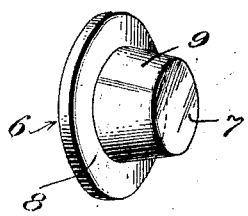
Fig. 4 is an enlarged perspective view of a modified form of closure device, in the way of a plug adapted to be fitted into the wall of the tire from the outside.
Figure 5:
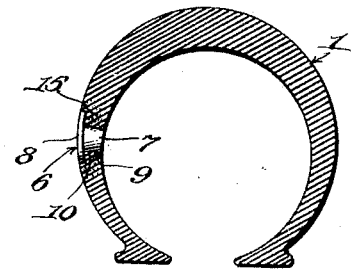
Fig. 5 is a section of the tire with the plug applied.

Referring to the modification shown in Figures 4 and 5, the numeral 6 designates a closure as a whole, which comprises a central plug portion 7 integral with or cemented to a flat member 8, thus providing a flange which is cemented or vulcanized to the outer surface of the tire, there being a plurality of such closures preferably arranged in opposite walls of the tire or shoe, and in staggered arrangement like the patches in Figures 1 and 2.

The central plug portion 7 of the closure is slightly bevelled as indicated at 9, and the opening 10 in the tire wall is correspondingly shaped so as to fit snugly within the opening wherein it is cemented, glued or otherwise attached, thus the closure is secured to the shoe at points between the flange and the outer surface of the tire, and at points between the wall of the opening in the tire, and the periphery of the conical plug.

Figure 6:
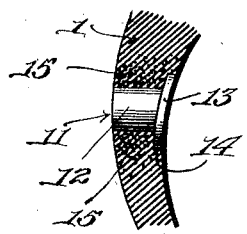
Fig. 6 is a view showing the plug applied from the inside, the plug being somewhat different in shape from the plug shown in Figures 4 and 5.

In the modification shown in Fig. 6, a plug 11 is applied to the shoe by inserting it from the inside of the tire. This plug has a cylindrical portion 12 integral with or cemented to the flange 13 which lies in the countersink 14 in the wall as shown. This plug, as in the case of the other plug or patches, is cemented, vulcanized or otherwise held in place.

Preferably, the shoe is reinforced immediately adjacent to the holes covered by the patches, and filled by the plugs, as indicated in Figures 1, 3 and 6 by the numeral 15; thus in case of a blow-out preventing injury to the tire adjacent the openings.

It will be understood that the tire is used with the usual inner tube, and the arrangement is such, as stated at the outset, that when the tire is subjected to extraordinary shock, or a shock considerably in excess of that endured in ordinary operation, the blow-out will occur at the point of attachment of the patches, plugs, or other device.

I do not desire to limit myself to the idea of putting the patches, as shown in Figures 1 and 2 of the drawing, on the inside of the tire. The material of the shoe on the outside adjacent to the openings may be countersunk, and the patches placed on the outside, and it will be further understood that many changes and modifications within the spirit of the invention may be made.

Claim:

In a protective device for automobile tires wherewith an inner tube is employed, the combination with a tire shoe having an opening therein provided with a countersunk recess at its inner end, said opening being formed in the shoe during manufacture, of a closure for said opening having a peripheral portion held in and filling said recess, and said closure being flush with the surface of the shoe.

In testimony whereof I affix my signature.

ALPHONSE F. MONEUSE.